(12) United States Patent  
Kimura

(10) Patent No.: US 8,995,005 B2  
(45) Date of Patent: Mar. 31, 2015

(54) IMAGE PROCESSING APPARATUS WITH MEMORY AREA MANAGEMENT PORTION

(71) Applicant: KYOCERA Document Solutions Inc., Osaka-shi, Osaka (JP)

(72) Inventor: Koichi Kimura, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/156,371

(22) Filed: Jan. 15, 2014

(65) Prior Publication Data

US 2014/0211262 A1 Jul. 31, 2014

(30) Foreign Application Priority Data

Jan. 29, 2013 (JP) ................................ 2013-014701

(51) Int. Cl.
*G06K 15/00* (2006.01)
*H04N 19/423* (2014.01)
*H04N 19/63* (2014.01)

(52) U.S. Cl.
CPC ............. *H04N 19/423* (2014.11); *H04N 19/63* (2014.11)
USPC .......... 358/1.16; 358/1.15; 382/232; 382/233; 709/247

(58) Field of Classification Search
CPC .......................... H04N 19/00169; H04N 19/00
USPC .......... 358/1.15, 1.16; 382/232, 233; 709/247
See application file for complete search history.

(56) References Cited

U.S. PATENT DOCUMENTS

| 6,330,374 B1 | 12/2001 | Yamaguchi et al. | |
|---|---|---|---|
| 2002/0191865 A1* | 12/2002 | Yamaguchi et al. | 382/297 |
| 2005/0021816 A1* | 1/2005 | Ishikawa | 709/231 |
| 2011/0123127 A1* | 5/2011 | Mima et al. | 382/239 |

FOREIGN PATENT DOCUMENTS

| JP | 2000165656 A | 6/2000 |
|---|---|---|
| JP | 2003-178300 A | 6/2003 |
| JP | 2007129741 A | 5/2007 |

\* cited by examiner

*Primary Examiner* — Jacky X Zheng
(74) *Attorney, Agent, or Firm* — Alleman Hall McCoy Russell & Tuttle LLP

(57) ABSTRACT

In an image processing apparatus, a memory area management portion generates a descriptor for a block storage area allocated in each of a first work memory and a second work memory, and generates sub-band management data associated with the descriptor for the block storage area in which compressed sub-band data is stored, sequentially according to arrangement of the sub-band data in the primary scanning direction and the secondary scanning direction in image data. A data loading portion changes, according to a rotation angle, the association between the sub-band management data and the descriptor after the compressed sub-band data is stored in the second work memory. A decompression processing portion performs rotating process in the sub-band data according to the rotation angle.

6 Claims, 16 Drawing Sheets

Fig. 2

| | | | |
|---|---|---|---|
| BAND#1 | SB11 | SB12 | SB13 |
| BAND#2 | SB21 | SB22 | SB23 |
| BAND#3 | SB31 | SB32 | SB33 |
| BAND#4 | SB41 | SB42 | SB43 |

Fig. 9

| CSB11 | CSB12 | | CSB13 |
|---|---|---|---|
| CSB21 | CSB22 | CSB23 | CSB31 |
| | CSB32 | | CSB33 |
| | CSB41 | | CSB42 |
| CSB43 | | | |

Fig. 12

|  | | | | |
|---|---|---|---|---|
| BAND#1 | SB13 | SB23 | SB33 | SB43 |
| BAND#2 | SB12 | SB22 | SB32 | SB42 |
| BAND#3 | SB11 | SB21 | SB31 | SB41 |

Fig. 15

|        | | | | |
|--------|------|------|------|------|
| BAND#1 | SB13 | SB23 | SB33 | SB43 |
| BAND#2 | SB12 | SB22 | SB32 | SB42 |
| BAND#3 | SB11 | SB21 | SB31 | SB41 |

IMAGE PROCESSING APPARATUS WITH MEMORY AREA MANAGEMENT PORTION

INCORPORATION BY REFERENCE

This application is based upon and claims the benefit of priority from the corresponding Japanese Patent Application No. 2013-014701 filed on Jan. 29, 2013, the entire contents of which are incorporated herein by reference.

BACKGROUND

The present disclosure relates to image processing apparatuses, image forming apparatuses, and an image processing method.

An image processing apparatuses may execute image processing in units of blocks obtained by dividing an image in the primary scanning direction and the secondary scanning direction.

In such an image processing apparatus, storage locations of the blocks in an image obtained after rotation are specified for each block. Image data of the blocks is stored at the storage locations to rotate the image.

SUMMARY

An image processing apparatus according to one aspect of the present disclosure includes: a memory; a compression processing portion; a data storing portion; a data loading portion; a decompression processing portion; and a memory area management portion. The compression processing portion is configured to compress image data in units of sub-band data, and store each piece of the sub-band data having been compressed, in a first work memory of the memory. The data storing portion is configured to read, from the first work memory, the sub-band data obtained by compressing the image data, and store the sub-band data having been compressed, in a data storage area. The data loading portion is configured to read the compressed sub-band data from the data storage area, and store each piece of the compressed sub-band data in a second work memory of the memory. The decompression processing portion is configured to decompress the compressed sub-band data stored in the second work memory. The memory area management portion is configured to allocate the first work memory in the memory, and transfer, from the first work memory, the sub-band data having been compressed and store, in the data storage area, the sub-band data having been compressed, and to thereafter deallocate the first work memory, and allocate the second work memory in the memory. Further, the memory area management portion performs the following (a) to (c). (a) Execution of physically allocating one or plural block storage areas in the memory, allocating, to the first work memory, the one or plural block storage areas that have been physically allocated, and generating first block management data with which the one or plural block storage areas are associated. (b) Execution of physically allocating one or plural block storage areas in the memory, allocating, to the second work memory, the one or plural block storage areas that have been physically allocated, and generating second block management data with which the one or plural block storage areas are associated. (c) Execution of generating, for each piece of the compressed sub-band data, sub-band management data associated with the block management data for the block storage area in which the compressed sub-band data is stored, sequentially according to an arrangement of the sub-band data in a primary scanning direction and a secondary scanning direction in the image data. The data loading portion changes, according to a rotation angle, an association between the sub-band management data and the block management data after the compressed sub-band data is stored in the second work memory. The decompression processing portion performs rotating process in the sub-band data according to the rotation angle.

An image forming apparatus according to another aspect of the present disclosure includes an image processing apparatus and a printing device that prints an image based on image data having been subjected to image processing by the image processing apparatus. The image processing apparatus includes: a memory; a compression processing portion; a data storing portion; a data loading portion; a decompression processing portion; and a memory area management portion. The compression processing portion is configured to compress image data in units of sub-band data, and store each piece of the sub-band data having been compressed, in a first work memory of the memory. The data storing portion is configured to read, from the first work memory, the sub-band data obtained by compressing the image data, and store the sub-band data having been compressed, in a data storage area. The data loading portion is configured to read the compressed sub-band data from the data storage area, and store each piece of the compressed sub-band data in a second work memory of the memory. The decompression processing portion is configured to decompress the compressed sub-band data stored in the second work memory. The memory area management portion is configured to allocate the first work memory in the memory, and transfer, from the first work memory, the sub-band data having been compressed and store, in the data storage area, the sub-band data having been compressed, and to thereafter deallocate the first work memory, and allocate the second work memory in the memory. Further, the memory area management portion performs the following (a) to (c). (a) Execution of physically allocating one or plural block storage areas in the memory, allocating, to the first work memory, the one or plural block storage areas that have been physically allocated, and generating first block management data with which the one or plural block storage areas are associated. (b) Execution of physically allocating one or plural block storage areas in the memory, allocating, to the second work memory, the one or plural block storage areas that have been physically allocated, and generating second block management data with which the one or plural block storage areas are associated. (c) Execution of generating, for each piece of the compressed sub-band data, sub-band management data associated with the block management data for the block storage area in which the compressed sub-band data is stored, sequentially according to an arrangement of the sub-band data in a primary scanning direction and a secondary scanning direction in the image data. The data loading portion changes, according to a rotation angle, an association between the sub-band management data and the block management data after the compressed sub-band data is stored in the second work memory. The decompression processing portion performs rotating process in the sub-band data according to the rotation angle.

An image processing method according to still another aspect of the present disclosure is executed by an image processing apparatus that includes: a memory; a compression processing portion; a data storing portion; a data loading portion; a decompression processing portion; and a memory area management portion. The compression processing portion is configured to compress image data in units of sub-band data, and store each piece of the sub-band data having been compressed, in a first work memory of the memory. The data storing portion is configured to read, from the first work memory, the sub-band data obtained by compressing the image data, and store the sub-band data having been compressed, in a data storage area. The data loading portion is configured to read the compressed sub-band data from the data storage area, and store each piece of the compressed sub-band data in a second work memory of the memory. The decompression processing portion is configured to decompress the compressed sub-band data stored in the second work memory. The memory area management portion is configured to allocate the first work memory in the memory, and transfer, from the first work memory, the sub-band data having been compressed and store, in the data storage area, the sub-band data having been compressed, and to thereafter deallocate the first work memory, and allocate the second work memory in the memory. Further, the memory area management portion performs the following (a) to (c). (a) Execution of physically allocating one or plural block storage areas in the memory, allocating, to the first work memory, the one or plural block storage areas that have been physically allocated, and generating first block management data with which the one or plural block storage areas are associated. (b) Execution of physically allocating one or plural block storage areas in the memory, allocating, to the second work memory, the one or plural block storage areas that have been physically allocated, and generating second block management data with which the one or plural block storage areas are associated. (c) Execution of generating, for each piece of the compressed sub-band data, sub-band management data associated with the block management data for the block storage area in which the compressed sub-band data is stored, sequentially according to an arrangement of the sub-band data in a primary scanning direction and a secondary scanning direction in the image data. The data loading portion changes, according to a rotation angle, an association between the sub-band management data and the block management data after the compressed sub-band data is stored in the second work memory. The decompression processing portion performs rotating process in the sub-band data according to the rotation angle.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 illustrates examples of image data and sub-band data.

FIG. 9 illustrates an example of compressed sub-band data corresponding to one piece of image data stored in a sort memory.

FIG. 12 illustrates a structure of image data obtained when an image of the image data shown in FIG. 2 has been rotated 90 degrees.

FIG. 15 illustrates an arrangement of sub-band data according to the association shown in FIG. 14.

DETAILED DESCRIPTION

Hereinafter, an embodiment of the present disclosure will be described with reference to the drawings.

Figure 1:
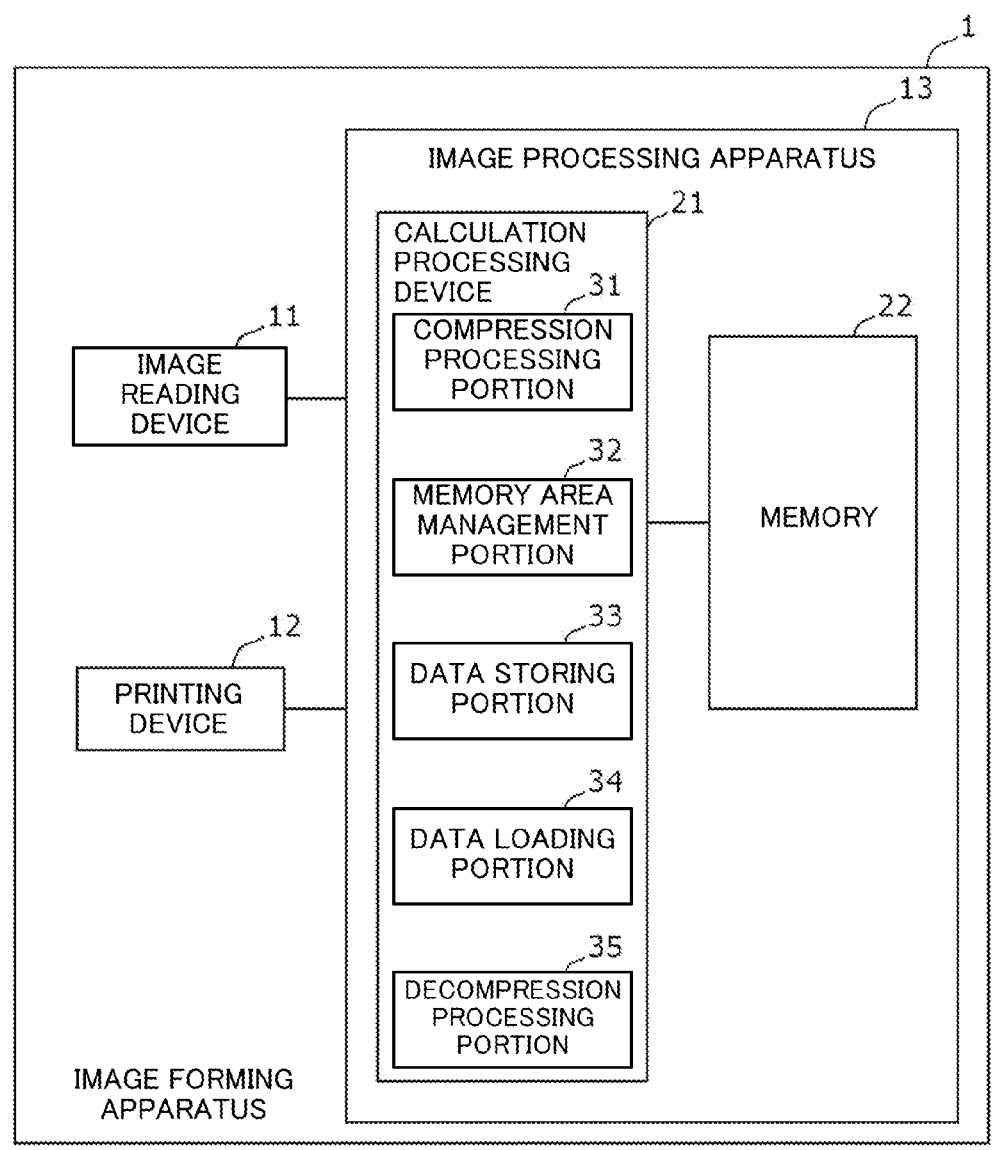
FIG. 1 is a block diagram illustrating a configuration of an image forming apparatus including an image processing apparatus according to an embodiment of the present disclosure.

FIG. 1 is a block diagram illustrating a configuration of an image forming apparatus including an image processing apparatus according to an embodiment of the present disclosure.

An image forming apparatus 1 is an apparatus such as a copy machine or a multifunction peripheral. The image forming apparatus 1 includes an image reading device 11, a printing device 12, and an image processing apparatus 13. The image reading device 11 is an internal device that optically reads a document sheet image, to generate image data of the document sheet image. The printing device 12 is an internal device that prints an image based on image data that has been subjected to image processing by the image processing apparatus 13.

In the case of uncompressed raster image data, rotation of an image is executable by a rotating process (for example, a process of specifying storage locations obtained after rotation) being performed for each block, as described above. On the other hand, when, for example, printing for a plurality of sheets is performed, image data is compressed, and stored in a sort memory, and thereafter the image data is read from the sort memory as appropriate, decompressed, and used in some cases. In this case, it is difficult to perform the rotating process for each block in a manner as described above if the image has not been decompressed. In this case, a work memory having a predetermined length sufficient for storing compressed band data needs to be allocated for each band.

Figure 16A:
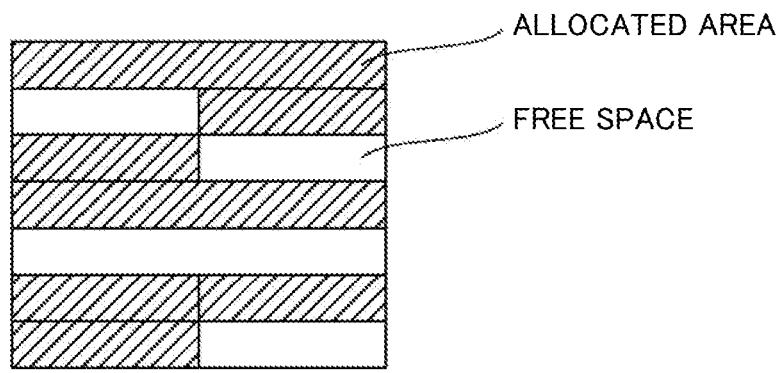
FIG. 16A, FIG. 16B, FIG. 16C, and FIG. 16D illustrate memory area management for allocating a storage area by division.
Figure 16B:
Figure 16C:
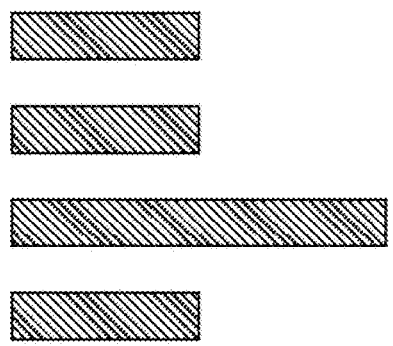
Figure 16D:
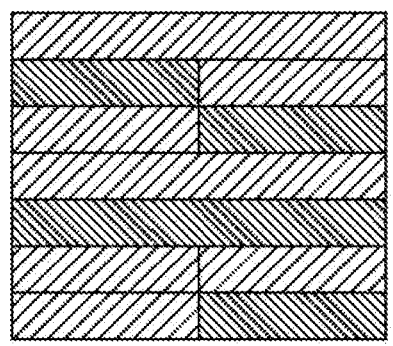

However, as shown in FIG. 16A, in a main storage device such as a RAM (Random Access Memory), fragmentation advances and small free spaces are scattered in some cases. In this case, it is difficult to allocate a long work memory as shown in FIG. 16B as one continuous storage area. Therefore, as shown in FIG. 16C, a plurality of small storage areas are physically allocated, and the plurality of small storage areas having been physically allocated are managed so as to be associated with each other, whereby one long work memory may be theoretically allocated. Thus, as shown in FIG. 16D, efficiency for using the storage area in the main storage device is enhanced, whereby, for example, interruption of the process due to shortage of a storage area may be less likely to occur.

However, in a case where a storage area of a work memory is allocated by physical division, compressed band data having various data length is physically scattered in the main storage device. Therefore, it is difficult to simply perform the rotating process for each block as performed in the image processing apparatus described above. On the other hand, in the image processing apparatus 13 according to the present embodiment, as described below, a memory area management for allocating a storage area of a work memory by physical division is performed, and in a case where image data is stored in a compressed state, image rotation can be performed in a simple process.

The image processing apparatus 13 includes a calculation processing device 21 and a memory 22.

The calculation processing device 21 includes a computer, an ASIC (Application Specific Integrated Circuit), and the like. In the calculation processing device 21, various processing portions are implemented by software and/or hardware. The memory 22 is a main storage device such as a RAM.

The calculation processing device 21 includes a compression processing portion 31, a memory area management portion 32, a data storing portion 33, a data loading portion 34, and a decompression processing portion 35.

The compression processing portion 31 compresses image data for each sub-band data, and stores each piece of the compressed sub-band data in a first work memory of the memory 22. Although each sub-band data has a constant data length, the data length of the compressed sub-band data varies depending on a data value.

The sub-band data is data obtained by band data of image data being divided in the primary scanning direction. The sub-band data is image data, in an image area, having the same number of pixels in the primary scanning direction and the secondary scanning direction.

FIG. 2 illustrates examples of image data and sub-band data. Image data of one page as shown in FIG. 2 includes four bands #1 to #4. Each of the bands #i (i=1, 2, 3, or 4) has a predetermined number of lines. In this example, band data of the band #i includes sub-band data SBi1 to SBi3.

The memory area management portion 32 allocates the first work memory in the memory 22, and deallocates the first work memory after compressed sub-band data has been transferred from the first work memory and stored in the sort memory. Further, when the compressed sub-band data is loaded from the sort memory, the memory area management portion 32 allocates a second work memory in the memory 22. The sort memory is allocated in the memory 22 or another storage device which is not shown.

The data storing portion 33 reads, from the first work memory, the sub-band data obtained by compressing image data, and stores the compressed sub-band data in the sort memory.

The data loading portion 34 reads the compressed sub-band data from the sort memory, and stores each piece of the compressed sub-band data in the second work memory of the memory 22. The data loading portion 34 changes an association between sub-band management data and a descriptor according to a rotation angle after the compressed sub-band data has been stored in the second work memory.

The decompression processing portion 35 decompresses the compressed sub-band data stored in the second work memory. The decompression processing portion 35 performs rotating process in the sub-band data according to a rotation angle.

Hereinafter, the memory area management performed by the memory area management portion 32 will be described.

The memory area management portion 32 physically allocates, in the memory 22, one or plural block storage areas, and allocates the one or plural allocated block storage areas to the first work memory, and generates descriptors with which the one or plural allocated block storage areas are associated.

Further, the memory area management portion 32 physically allocates, in the memory 22, one or plural block storage areas, and allocates the one or plural allocated block storage areas to the second work memory, and generates descriptors with which the one or plural allocated block storage areas are associated.

The descriptor will be described in detail.

Figure 3:
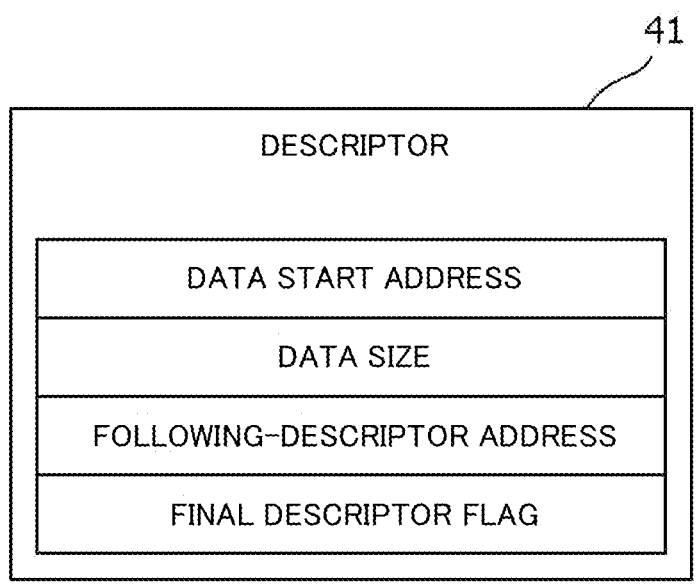
FIG. 3 illustrates an exemplary structure of a descriptor used in the image processing apparatus shown in FIG. 1.

FIG. 3 illustrates an exemplary structure of the descriptor used in the image processing apparatus 13 shown in FIG. 1.

A descriptor 41 represents a data start address, a data size, a following-descriptor address, and a final descriptor flag.

The "data start address" represents a beginning address of the block storage area.

The "data size" represents a data size of data stored in the block storage area.

The "following-descriptor address" represents a beginning address of a following descriptor. When there is no following descriptor, NULL is set as the following-descriptor address.

The "final descriptor flag" is a flag indicating whether or not the descriptor is a final descriptor. When there is a following descriptor, the final descriptor flag is set to one. When there is no following descriptor, the final descriptor flag is set to zero.

Namely, when the number of the descriptors 41 is plural, the plural descriptors 41 are associated according to a list structure.

Figure 4:
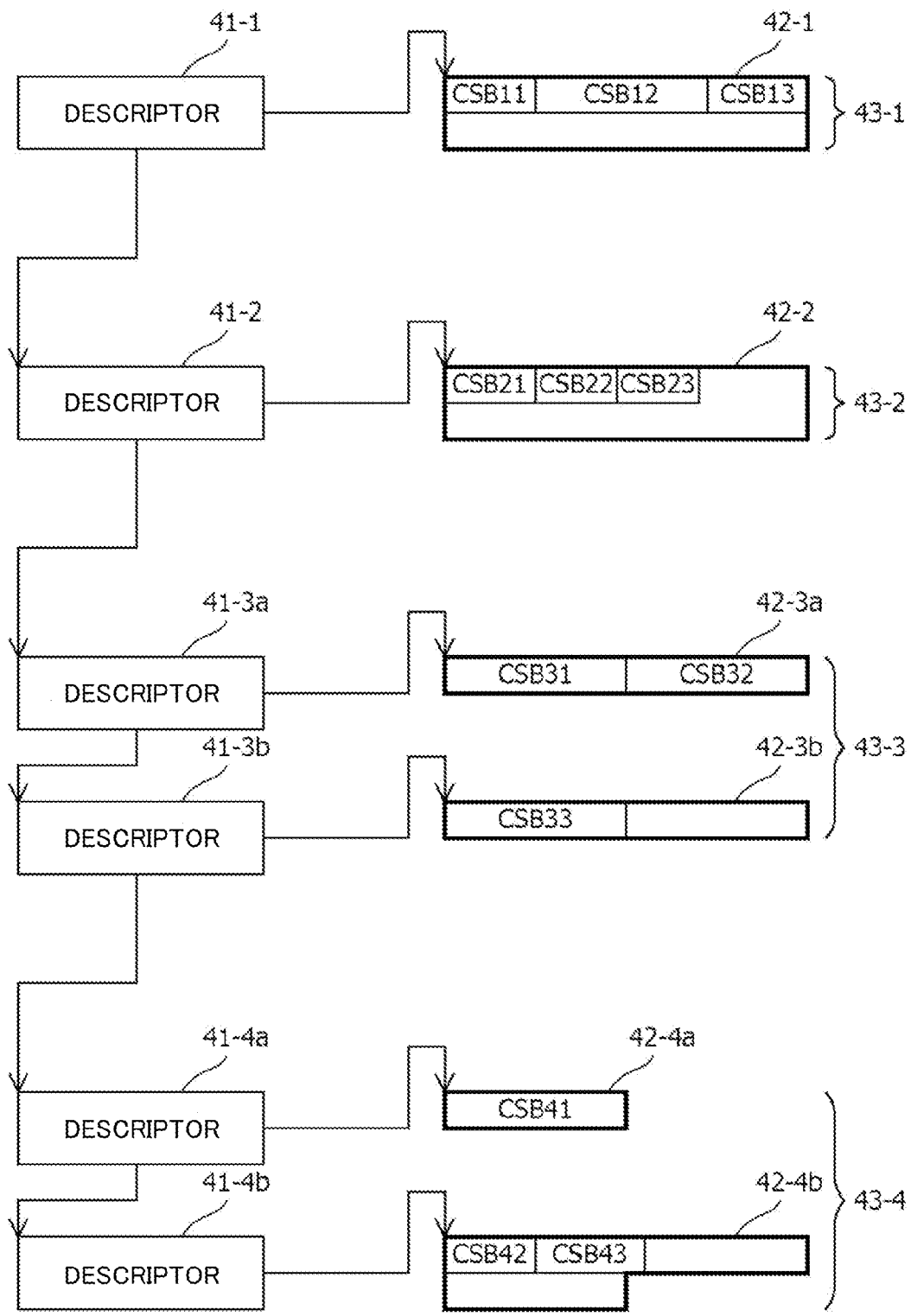
FIG. 4 illustrates management of a work memory according to the descriptor shown in FIG. 3.

FIG. 4 illustrates management of a work memory according to the descriptor shown in FIG. 3.

In the present embodiment, the memory area management portion 32 allocates one first work memory and one second work memory for one piece of band data. For example, for bands #1 to #4 shown in FIG. 2, the first work memories 43-1 to 43-4, respectively, are allocated as shown in FIG. 4. The first work memories 43-1 to 43-4 have the same size.

In FIG. 4, one block storage area 42-1 is allocated to the first work memory 43-1, one block storage area 42-2 is allocated to the first work memory 43-2, two block storage areas 42-3a and 42-3b are allocated to the first work memory 43-3, and two block storage areas 42-4a and 42-4b are allocated to the first work memory 43-4.

Descriptors 41-1, 41-2, 41-3a, 41-3b, 41-4a, and 41-4b are generated so as to correspond to the block storage areas 42-1, 42-2, 42-3a, 42-3b, 42-4a, and 42-4b, respectively.

In the descriptor 41-1, the beginning address of the block storage area 42-1 is set as the "data start address", the beginning address of the descriptor 41-2 is set as the "following-descriptor address", and the "final descriptor flag" is set to one. The compressed sub-band data CSB11 to CSB13 are stored in the block storage area 42-1, and a sum of the sizes of the compressed sub-band data CSB11 to CSB13 is set as the "data size" of the descriptor 41-1.

In the descriptor 41-2, the beginning address of the block storage area 42-2 is set as the "data start address", the beginning address of the descriptor 41-3a is set as the "following-descriptor address", and the "final descriptor flag" is set to one. The compressed sub-band data CSB21 to CSB23 are stored in the block storage area 42-2, and a sum of the sizes of the compressed sub-band data CSB21 to CSB23 is set as the "data size" of the descriptor 41-2.

In the descriptor 41-3a, the beginning address of the block storage area 42-3a is set as the "data start address", the beginning address of the descriptor 41-3b is set as the "following-descriptor address", and the "final descriptor flag" is set to one. The compressed sub-band data CSB31 and CSB32 are stored in the block storage area 42-3a, and a sum of the sizes of the compressed sub-band data CSB31 and CSB32 is set as the "data size" of the descriptor 41-3a.

In the descriptor 41-3b, the beginning address of the block storage area 42-3b is set as the "data start address", the beginning address of the descriptor 41-4a is set as the "following-descriptor address", and the "final descriptor flag" is set to one. The compressed sub-band data CSB33 is stored in the block storage area 42-3b, and the size of the compressed sub-band data CSB33 is set as the "data size" of the descriptor 41-3b.

Namely, in this example, in the first work memory 43-3, the compressed sub-band data CSB31 and CSB32, and the compressed sub-band data CSB33 are stored in the different block storage areas 42-3a and 42-3b, respectively.

In the descriptor 41-4a, the beginning address of the block storage area 42-4a is set as the "data start address", the beginning address of the descriptor 41-4b is set as the "following-descriptor address", and the "final descriptor flag" is set to one. The compressed sub-band data CSB41 is stored in the block storage area 42-4a, and the size of the compressed sub-band data CSB41 is set as the "data size" of the descriptor 41-4a.

In the descriptor 41-4b, the beginning address of the block storage area 42-4b is set as the "data start address", NULL is set as the "following-descriptor address", and the "final descriptor flag" is set to zero. The compressed sub-band data CSB42 and CSB43 are stored in the block storage area 42-4b, and a sum of the sizes of the compressed sub-band data CSB42 and CSB43 is set as the "data size" of the descriptor 41-4b.

Namely, in this example, in the first work memory 43-4, the compressed sub-band data CSB41, and the compressed sub-band data CSB42 and CSB43 are stored in the different block storage areas 42-4a and 42-4b, respectively.

In the description herein, the descriptor for the first work memory is described. The same can be applied to the descriptor for the second work memory.

Further, the memory area management portion 32 generates, for each piece of the compressed sub-band data, sub-band management data associated with the descriptor of the block storage area in which the compressed sub-band data is stored, sequentially according to the arrangement of the sub-band data in the primary scanning direction and the secondary scanning direction in the image data.

The sub-band management data will be described in detail.

Figure 5:
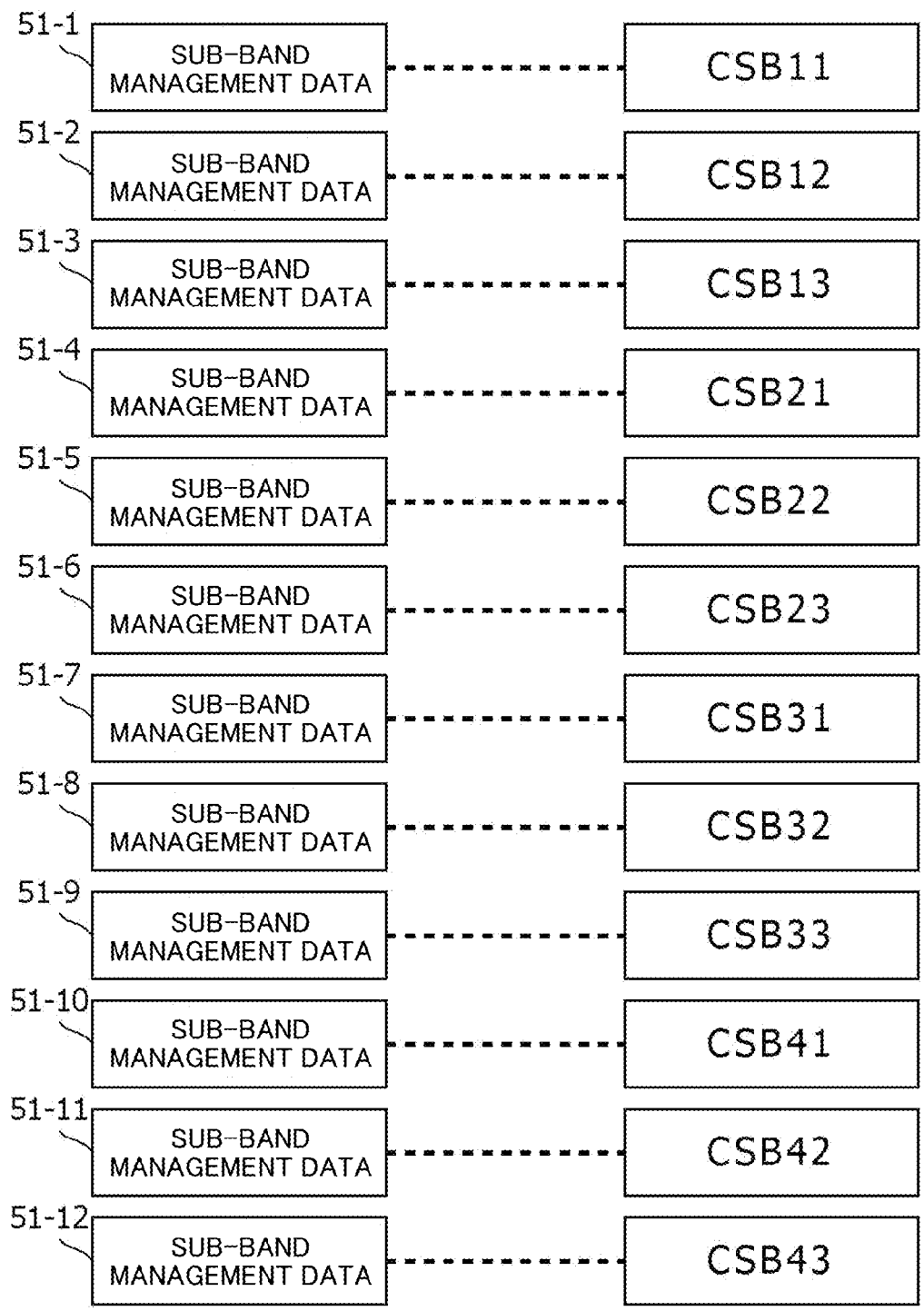
FIG. 5 illustrates management of compressed sub-band data according to sub-band management data used in the image processing apparatus shown in FIG. 1.

The sub-band management data is generated for each piece of the compressed sub-band data, and the number of pieces of the sub-band management data is the same as the number of pieces of the compressed sub-band data. FIG. 5 illustrates management of the compressed sub-band data according to the sub-band management data used in the image processing apparatus 13 shown in FIG. 1.

For example, for the sub-band data SB11 to SB43 shown in FIG. 2, 12 pieces of the compressed sub-band data CSB11 to CSB43, are generated as shown in FIG. 5. Therefore, 12 pieces of sub-band management data 51-1 to 51-12 are generated.

The first to third sub-band management data 51-1 to 51-3 are used to manage the compressed sub-band data CSB11 to CSB13 in the primary scanning direction.

The fourth to sixth sub-band management data 51-4 to 51-6 are used to manage, in the following band in the secondary scanning direction, the compressed sub-band data CSB21 to CSB23 in the primary scanning direction.

The seventh to ninth sub-band management data 51-7 to 51-9 are used to manage, in the following band in the secondary scanning direction, the compressed sub-band data CSB31 to CSB33 in the primary scanning direction.

The tenth to twelfth sub-band management data 51-10 to 51-12 are used to manage, in the following band in the secondary scanning direction, the compressed sub-band data CSB41 to CSB43 in the primary scanning direction.

Figure 6:
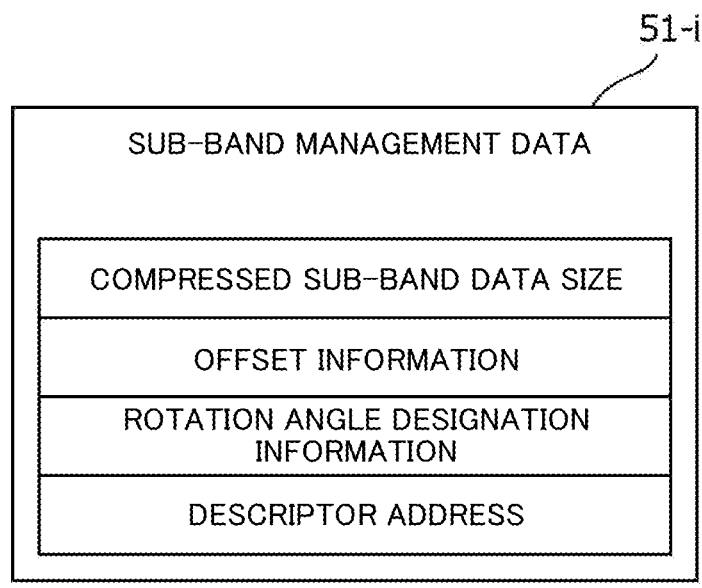
FIG. 6 illustrates an exemplary structure of the sub-band management data used in the image processing apparatus shown in FIG. 1.

FIG. 6 illustrates an exemplary structure of the sub-band management data used in the image processing apparatus 13 shown in FIG. 1.

The sub-band management data 51-$i$ (i=1, . . . , 12) represents a compressed sub-band data size, offset information, rotation angle designation information, and a descriptor address.

The "compressed sub-band data size" represents a size of the compressed sub-band data CSBjk managed by the sub-band management data 51-$i$.

The "offset information" represents an offset, of the start location of the compressed sub-band data CSBjk, from the head of the block storage area (the block storage area managed by the descriptor specified by the "descriptor address").

The "rotation angle designation information" represents information by which the rotation angle of an image of image data is designated as 0 degrees, 90 degrees, 180 degrees, or 270 degrees. For example, 0, 1, 2, or 3 is set as the "rotation angle designation information" so as to correspond to 0 degrees, 90 degrees, 180 degrees, or 270 degrees, respectively.

The "descriptor address" represents the beginning address of the descriptor for managing the block storage area in which (the head portion of) the compressed sub-band data CSBjk is stored.

Figure 7:
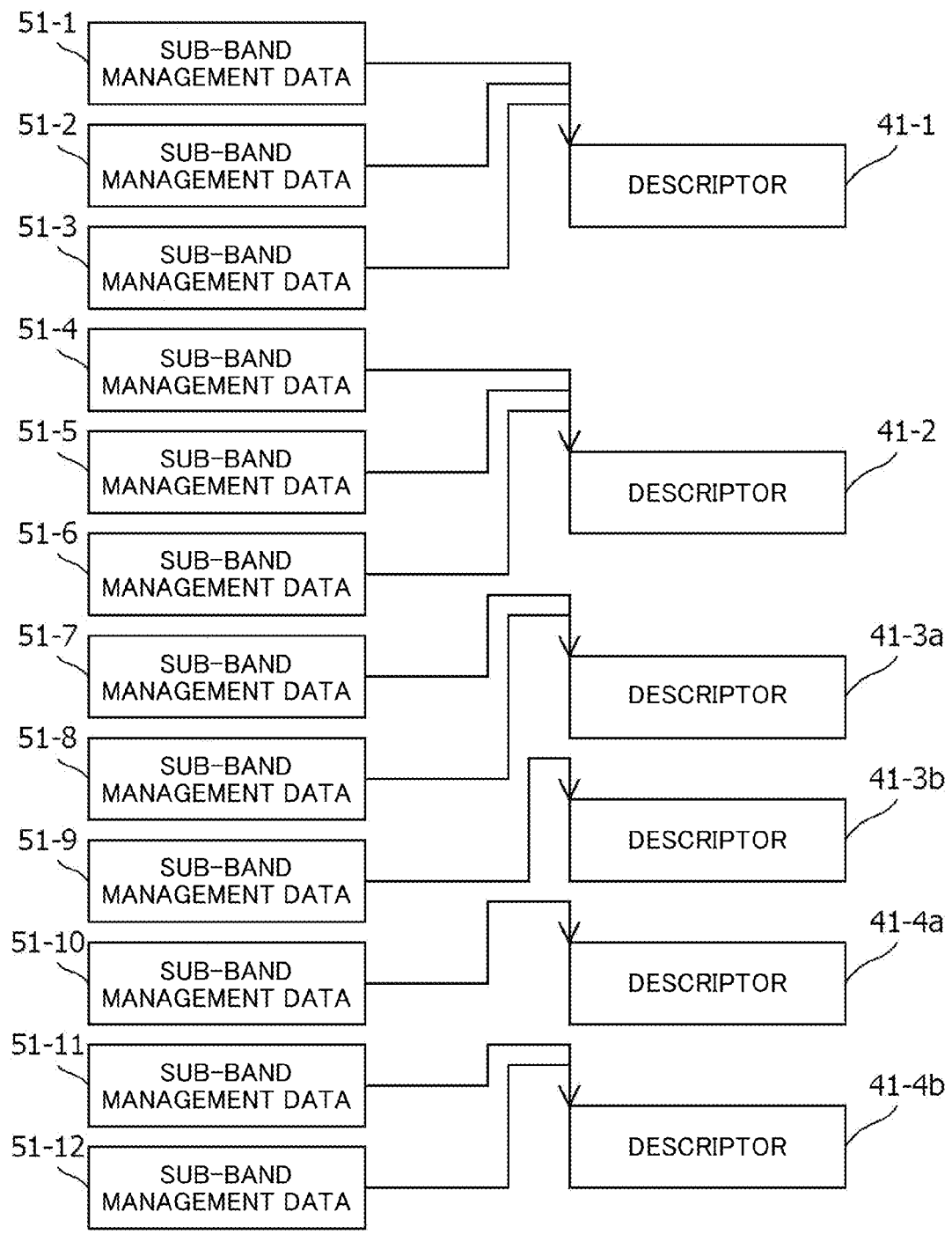
FIG. 7 illustrates an example of an association between the sub-band management data and the descriptor.

FIG. 7 illustrates an example of an association between the sub-band management data and the descriptor.

For example, as shown in FIG. 4, the compressed sub-band data CSB11 to CSB13 are stored in the block storage area 42-1 of the first work memory 43-1. Therefore, the "descriptor address" for the compressed sub-band data CSB11 to CSB13 represents the beginning address of the descriptor 41-1 of the block storage area 42-1.

The compressed sub-band data CSB21 to CSB23 are stored in the block storage area 42-2 of the first work memory 43-2. Therefore, the "descriptor address" for the compressed sub-band data CSB21 to CSB23 represents the beginning address of the descriptor 41-2 of the block storage area 42-2.

The compressed sub-band data CSB31 and CSB32 are stored in the block storage area 42-3a of the first work memory 43-3. Therefore, the "descriptor address" for the compressed sub-band data CSB31 and CSB32 represents the beginning address of the descriptor 41-3a of the block storage area 42-3a. The compressed sub-band data CSB33 is stored in the block storage area 42-3b of the first work memory 43-3. Therefore, the "descriptor address" for the compressed sub-band data CSB33 represents the beginning address of the descriptor 41-3b of the block storage area 42-3b.

The compressed sub-band data CSB41 is stored in the block storage area 42-4a of the first work memory 43-4. Therefore, the "descriptor address" for the compressed sub-band data CSB41 represents the beginning address of the descriptor 41-4a of the block storage area 42-4a. The compressed sub-band data CSB42 and CSB43 are stored in the block storage area 42-4b of the first work memory 43-4. Therefore, the "descriptor address" for the compressed sub-band data CSB42 and CSB43 represents the beginning address of the descriptor 41-4b of the block storage area 42-4b.

The association between the sub-band management data and the descriptor as shown in FIG. 7 is for a case where the compressed sub-band data CSB11 to CSB43 are stored in the first work memories 43-1 to 43-4.

In a case where the first work memories 43-1 to 43-4 are deallocated, and the second work memory is allocated anew, and the compressed sub-band data CSB11 to CSB43 are loaded into the second work memory, association between the sub-band management data and the descriptor is updated.

When the data loading portion 34 updates the association between the sub-band management data 51 and the descriptor, the offset information is changed to represent a value of an offset from the head of a block storage area associated with the second work memory.

The memory area management portion 32 specifies, for one piece of band data, the total size of the compressed sub-band data corresponding to the one piece of band data, based on the sub-band management data 51, and allocates a storage area having a size based on the total size, as one second work memory.

The data loading portion 34 updates the association between the sub-band management data 51 and the descriptor according to a rotation angle designated by the rotation angle designation information. The decompression processing portion 35 performs rotating process in the sub-band data according to the rotation angle designated by the rotation angle designation information.

Next, an operation of the image processing apparatus 13 will be described.

Figure 8:
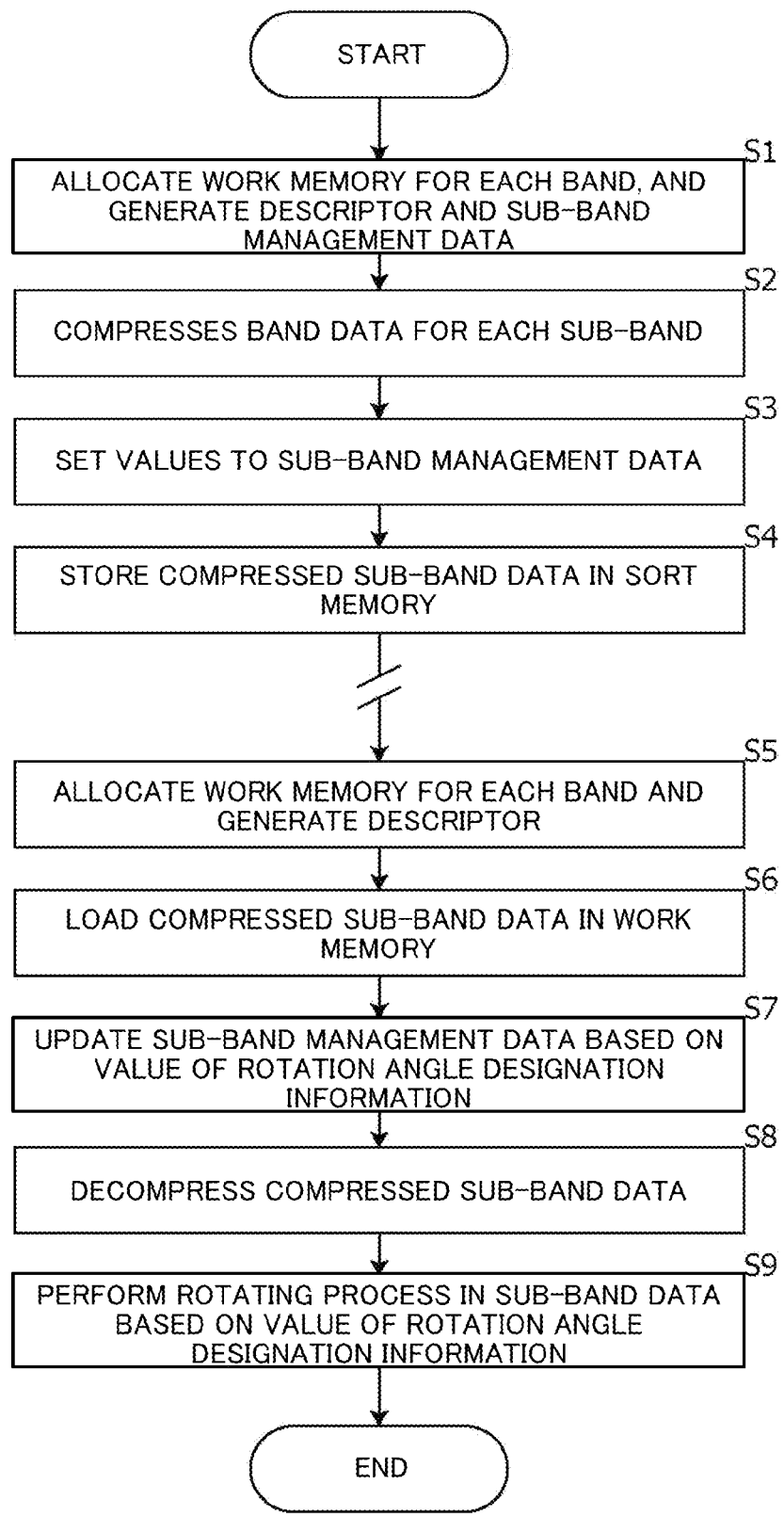
FIG. 8 is a flow chart showing an operation of the image processing apparatus shown in FIG. 1.

FIG. 8 is a flow chart showing an operation of the image processing apparatus 13 shown in FIG. 1.

The memory area management portion 32 allocates, for each band, a block storage area in a free space of the memory 22, allocates the block storage area to the first work memory, generates a descriptor for each block storage area, and generates the sub-band management data for each sub-band (step S1).

At this time, the "descriptor address" and a value of the "rotation angle designation information" of each sub-band management data 51-i are set. The value of the "rotation angle designation information" is specified based on, for example, setting for a job such as copying or printing.

The compression processing portion 31 compresses the sub-band data SBij of each band, and stores the compressed sub-band data in the first work memory (step S2).

Through the memory area management portion 32, values of the "compressed sub-band data size" and the "offset information" are set to each sub-band management data 51-i (step S3).

For example, at this time point, for the sub-band data SB11 to SB43 as shown in FIG. 2, the descriptors 41-1 to 41-4b are as shown in FIG. 4, and the sub-band management data 51-1 to 51-12 are as shown in FIG. 5 and FIG. 7.

Next, the data storing portion 33 reads the compressed sub-band data CSBij from the first work memory sequentially in the primary scanning direction and the secondary scanning direction so as to be continuous, and stores the compressed sub-band data CSBij in the sort memory (step S4).

FIG. 9 illustrates an example of the compressed sub-band data corresponding to one piece of image data stored in the sort memory. For example, the compressed sub-band data CSB11 to CSB43 obtained by compressing the sub-band data SB11 to SB43 as shown in FIG. 2 are stored in the sort memory so as to be continuous as shown in FIG. 9.

Thus, image data corresponding to one page is stored in the sort memory in a compressed state. After the compressed sub-band data CSBij is stored in the sort memory, the first work memory is deallocated, and the descriptors for the block storage areas of the first work memory are discarded. Thereafter, the image data is read from the sort memory and is decompressed when needed for printing or the like. When an image needs to be rotated, rotation of the image as well as the decompression is performed.

In this case, the memory area management portion 32 firstly identifies the size of each compressed sub-band data CSBij for each band with reference to the sub-band management data 51-i, allocates the block storage area necessary for the compressed sub-band data CSBij, allocates the block storage areas to the second work memory, and generates the descriptor for each block storage area (step S5).

The data loading portion 34 sequentially reads the compressed sub-band data CSBij from the sort memory, and loads the compressed sub-band data CSBij into the second work memory (step S6).

Figure 10:
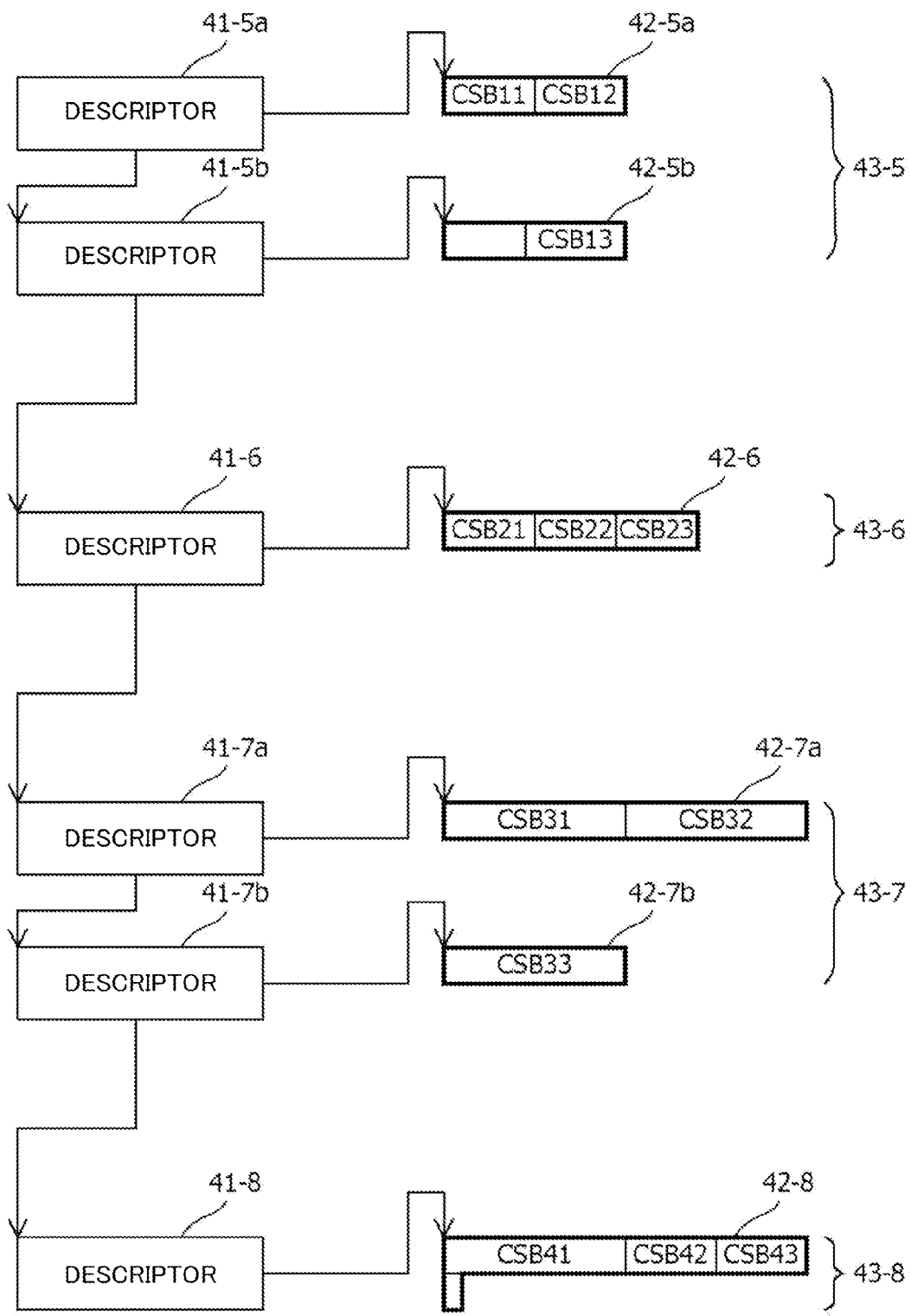
FIG. 10 illustrates management of the work memory according to the descriptor as is performed after loading from the sort memory.

FIG. 10 illustrates management of the work memory according to the descriptors as is performed after loading from the sort memory.

In a case where the compressed sub-band data CSB11 to CSB43 stored in the sort memory as shown in FIG. 9 are loaded, two block storage areas 42-5a and 42-5b are allocated to the second work memory 43-5, one block storage area 42-6 is allocated to the second work memory 43-6, two block storage areas 42-7a and 42-7b are allocated to the second work memory 43-7, one block storage area 42-8 is allocated to the second work memory 43-8, as shown in, for example, FIG. 10.

The descriptors 41-5a, 41-5b, 41-6, 41-7a, 41-7b, and 41-8 are generated so as to correspond to the block storage areas 42-5a, 42-5b, 42-6, 42-7a, 42-7b, and 42-8, respectively.

In the descriptor 41-5a, the beginning address of the block storage area 42-5a is set as the "data start address", the beginning address of the descriptor 41-5b is set as the "following-descriptor address", and the "final descriptor flag" is set to one. The compressed sub-band data CSB11 and (a portion of) the compressed sub-band data CSB12 are stored in the block storage area 42-5a, and a sum of the sizes of the compressed sub-band data CSB11 and (a portion of) the compressed sub-band data CSB12 is set as the "data size" of the descriptor 41-5a.

In the descriptor 41-5b, the beginning address of the block storage area 42-5b is set as the "data start address", the beginning address of the descriptor 41-6 is set as the "following-descriptor address", and the "final descriptor flag" is set to one. In a case where the remaining portion of the compressed sub-band data CSB12, and the compressed sub-band data CSB13 are stored in the block storage area 42-5b, a sum of the sizes of the remaining portion of the compressed sub-band data CSB12, and the compressed sub-band data CSB13 is set as the "data size" of the descriptor 41-5b.

Namely, in this example, in the second work memory 43-5, the compressed sub-band data CSB11 and (a portion of) the compressed sub-band data CSB12, and (the remaining portion of) the compressed sub-band data CSB12 and the compressed sub-band data CSB13 are stored in the different block storage areas 42-5a and 42-5b, respectively.

In the descriptor 41-6, the beginning address of the block storage area 42-6 is set as the "data start address", the beginning address of the descriptor 41-7a is set as the "following-descriptor address", and the "final descriptor flag" is set to one. The compressed sub-band data CSB21 to CSB23 are stored in the block storage area 42-6, and a sum of the sizes of the compressed sub-band data CSB21 to CSB23 is set as the "data size" of the descriptor 41-6.

In the descriptor 41-7a, the beginning address of the block storage area 42-7a is set as the "data start address", the beginning address of the descriptor 41-7b is set as the "following-descriptor address", and the "final descriptor flag" is set to one. The compressed sub-band data CSB31 and CSB32 are stored in the block storage area 42-7a, and a sum of the sizes of the compressed sub-band data CSB31 and CSB32 is set as the "data size" of the descriptor 41-7a.

In the descriptor 41-7b, the beginning address of the block storage area 42-7b is set as the "data start address", the beginning address of the descriptor 41-8 is set as the "following-descriptor address", and the "final descriptor flag" is set to one. The compressed sub-band data CSB33 is stored in the block storage area 42-7b, and the size of the compressed sub-band data CSB33 is set as the "data size" of the descriptor 41-7b.

Namely, in this example, in the second work memory 43-7, the compressed sub-band data CSB31 and CSB32, and the compressed sub-band data CSB33 are stored in the different block storage areas 42-7a and 42-7b, respectively.

In the descriptor 41-8, the beginning address of the block storage area 42-8 is set as the "data start address", NULL is set as the "following-descriptor address", and the "final descriptor flag" is set to zero. The compressed sub-band data CSB41 to CSB43 are stored in the block storage area 42-8, and a sum of the sizes of the compressed sub-band data CSB41 to CSB43 is set as the "data size" of the descriptor 41-8.

Next, the data loading portion 34 updates the sub-band management data 51-i, and associates the descriptor which is generated according to the allocated second work memory, with the sub-band management data 51-i (step S7). At this time, the data loading portion 34 reads the rotation angle designation information from the sub-band management data 51-i, and associates the descriptor with the sub-band management data 51-i according to the rotation angle designated by the rotation angle designation information. Further, at this time, the offset information in the sub-band management data 51-i is also updated.

Figure 11:
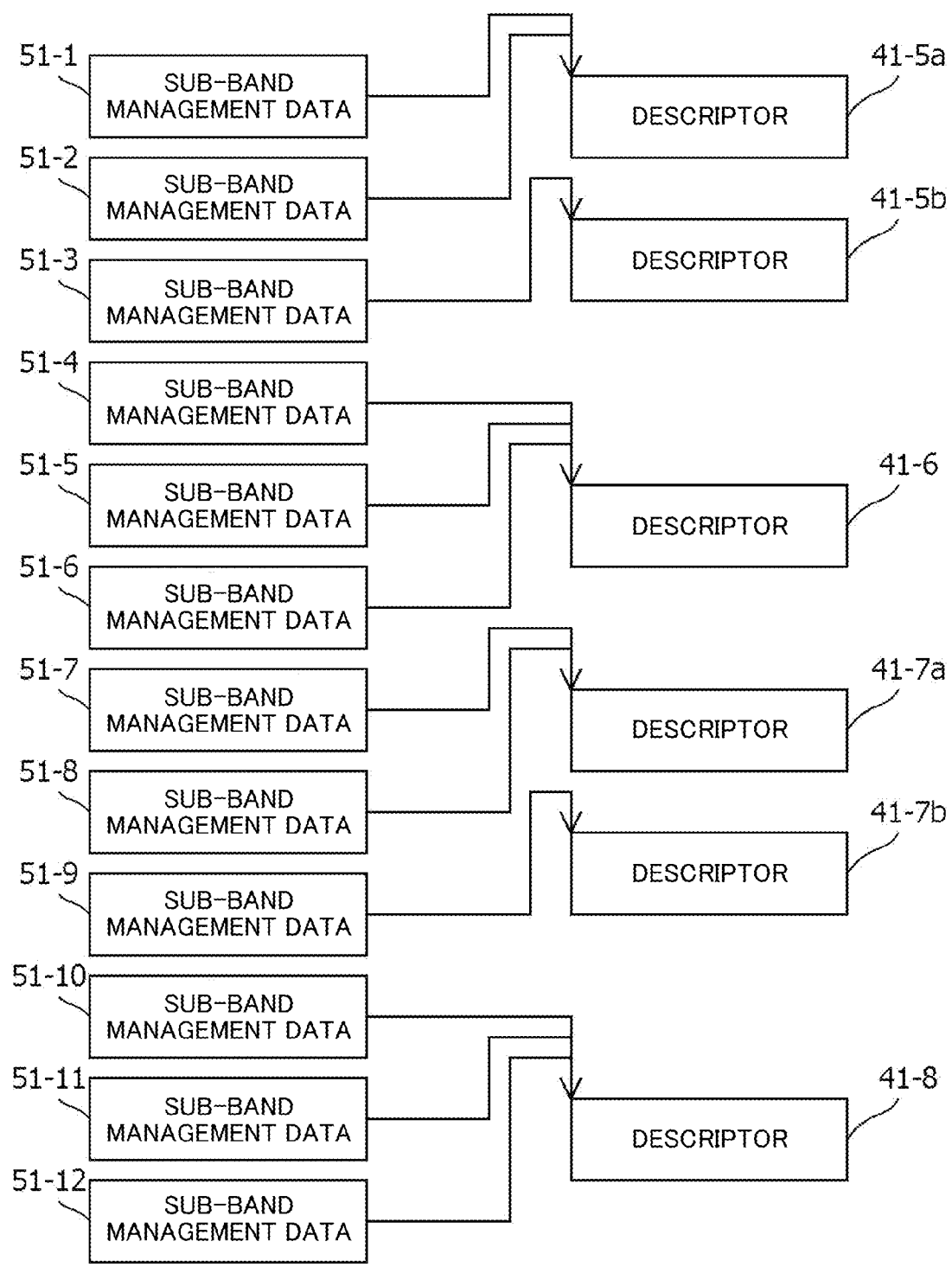
FIG. 11 illustrates an example of an association between the sub-band management data and the descriptor as is obtained after loading from the sort memory in the case of a rotation angle designated by rotation angle designation information being 0 degrees.

For example, in the case of the image data shown in FIG. 2, when the rotation angle designated by the rotation angle designation information is 0 degrees (namely, in the case of no rotation being performed), the arrangement of the sub-band data SB11 to SB43 obtained by decompression after the loading, is as shown in FIG. 2. Therefore, in a case where the rotation angle designated by the rotation angle designation information is 0 degrees, the descriptors 41-5a to 41-8 are associated with the sub-band management data 51-1 to 51-12 as shown in FIG. 11. FIG. 11 illustrates an example of an association between the sub-band management data and the descriptor as is obtained after loading from the sort memory in the case of the rotation angle designated by the rotation angle designation information being 0 degrees (that is, in the case of no rotation being performed).

On the other hand, in the case of the image data shown in FIG. 2, when the rotation angle designated by the rotation angle designation information is 90 degrees, the arrangement of the sub-band data SB11 to SB43 obtained by decompression after the loading, is as shown in FIG. 12. FIG. 12 illustrates a structure of image data obtained when an image of the image data shown in FIG. 2 has been rotated 90 degrees.

Figure 13:
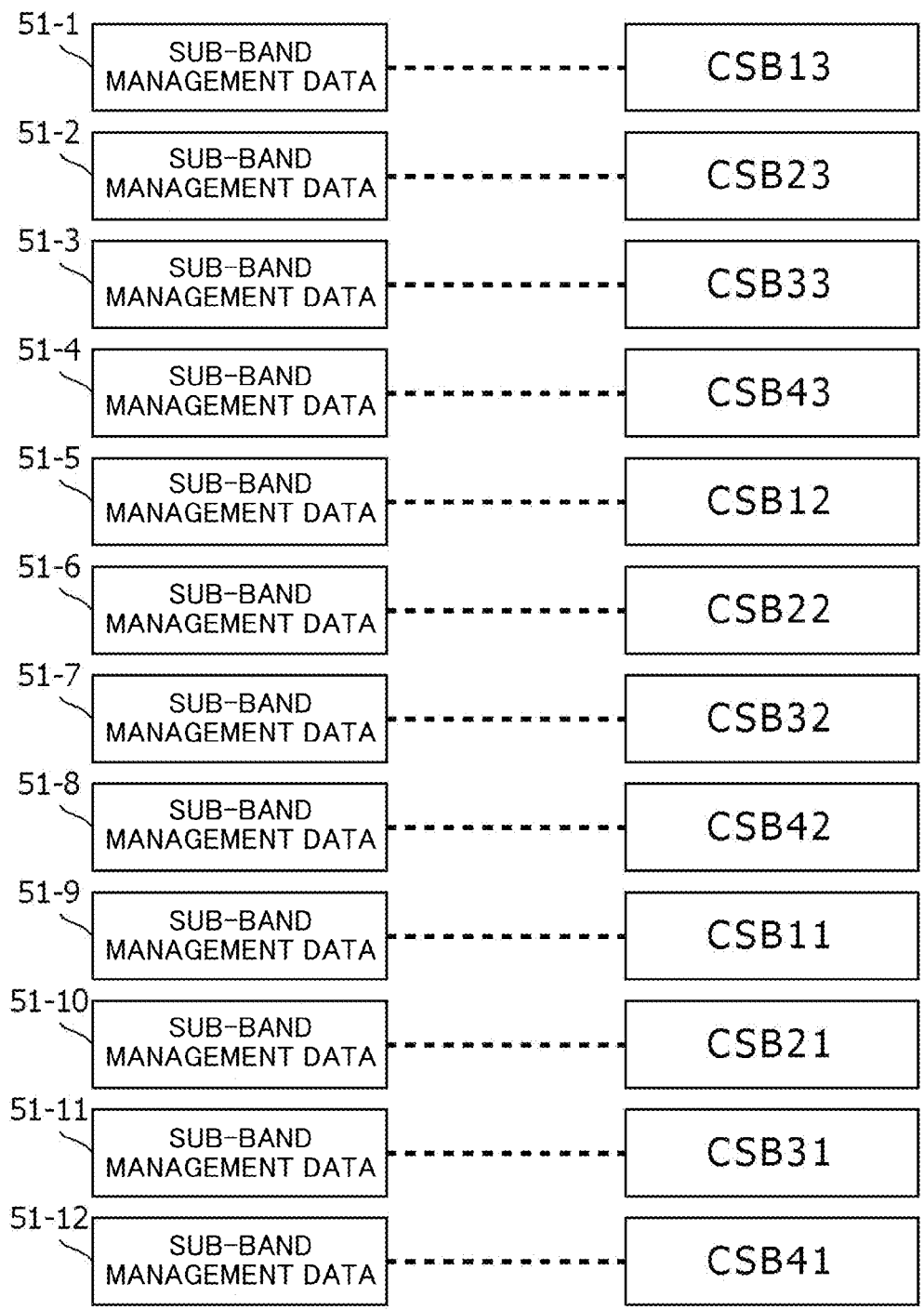
FIG. 13 illustrates management of compressed sub-band data according to the sub-band management data as is performed after 90-degree rotation.

Since the arrangement of the sub-band data SB11 to SB43 is changed as shown in FIG. 12, the compressed sub-band data CSBjk managed by the sub-band management data 51-i is also changed as shown in FIG. 13. FIG. 13 illustrates management of the compressed sub-band data according to the sub-band management data as is performed after 90-degree rotation.

Namely, in this case, the sub-band management data 51-1 to 51-4 are used to manage the compressed sub-band data CSB13, CSB23, CSB33, and CSB43, the sub-band management data 51-5 to 51-8 are used to manage the compressed sub-band data CSB12, CSB22, CSB32, and CSB42, and the sub-band management data 51-9 to 51-12 are used to manage the compressed sub-band data CSB11, CSB21, CSB31, and CSB41.

Figure 14:
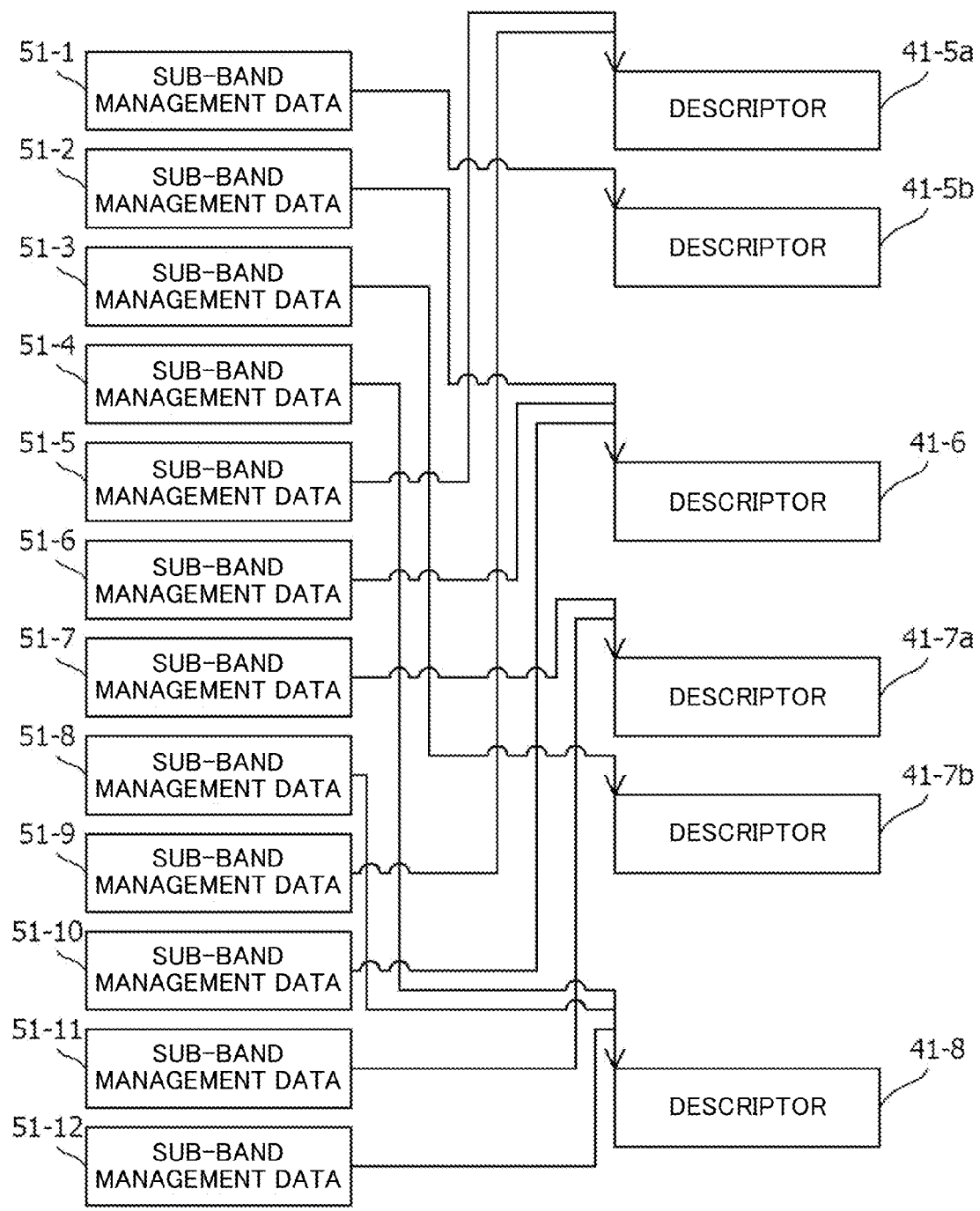
FIG. 14 illustrates an example of an association between the sub-band management data and the descriptor as is obtained after loading from the sort memory in the case of a rotation angle designated by the rotation angle designation information being 90 degrees.

In this case, as shown in FIG. 14, the descriptors 41-5a to 41-8 are associated with the sub-band management data 51-1 to 51-12. FIG. 14 illustrates an example of an association between the sub-band management data and the descriptor as is obtained after loading from the sort memory in the case of the rotation angle designated by the rotation angle designation information being 90 degrees.

Namely, the descriptors generated when the compressed sub-band data CSBjk is loaded into the second work memory are associated with the sub-band management data 51-1 to 51-12, according to the rotation angle. Therefore, arrangement, in the memory 22, of the compressed sub-band data CSBjk (or the sub-band data SBjk) itself need not be changed according to the rotation angle.

While sequentially referring to the sub-band management data 51-i, the decompression processing portion 35 reads, from the second work memory, the compressed sub-band data CSBjk corresponding to the sub-band management data 51-i, and decompresses the compressed sub-band data CSBjk (step S8), performs rotating process for the sub-band data SBjk obtained by the decompression, according to the rotation angle, and stores the sub-band data SBjk at a storage location of the sub-band data according to the rotation angle (step S9).

For example, when the image of the image data shown in FIG. 2 is rotated 90 degrees, the arrangement of the sub-band data after the rotation is as shown in FIG. 15. FIG. 15 illustrates an arrangement of the sub-band data (that is, the sub-band data obtained after 90 degree rotation) according to the association shown in FIG. 14. Therefore, when each sub-band data SBjk having been subjected to 90 degree rotating process is stored at a storage location of the sub-band data, the arrangement is as shown in FIG. 12.

As described above, according to the above embodiment, the memory area management portion 32 (a) allocates one or plural physically allocated block storage areas, to the first work memory, in the memory 22, and generates the descriptor for each block storage area, (b) allocates one or plural physically allocated block storage areas, to the second work memory, in the memory 22, and generates the descriptor for each block storage area, and (c) generates the sub-band management data associated with the descriptor for the block storage area in which the compressed sub-band data is stored, sequentially according to the arrangement of the sub-band data in the primary scanning direction and the secondary scanning direction in the image data. The data loading portion 34 stores the compressed sub-band data in the second work memory, and thereafter changes an association between the sub-band management data and the descriptor according to the rotation angle. The decompression processing portion 35 performs rotating process in the sub-band data according to the rotation angle.

Thus, in the image processing apparatus 13, the memory area management for allocating a storage area of the work memory by physical division is performed, and in a case where image data is compressed and stored, rotation of the image can be performed in a simple process.

The present disclosure is applicable to image processing apparatuses in image forming apparatuses such as copy machines and multifunctional peripherals.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
a memory;
a compression processing portion configured to compress image data in units of sub-band data, and store each piece of the sub-band data having been compressed in a first work memory of the memory;
a data storing portion configured to read, from the first work memory, the sub-band data obtained by compressing the image data, and store the sub-band data having been compressed in a data storage area;
a data loading portion configured to read the compressed sub-band data from the data storage area, and store each piece of the compressed sub-band data in a second work memory of the memory;
a decompression processing portion configured to decompress the compressed sub-band data stored in the second work memory; and
a memory area management portion configured to allocate the first work memory in the memory, and transfer, from the first work memory, the sub-band data having been compressed and store, in the data storage area, the sub-band data having been compressed, and to thereafter deallocate the first work memory, and allocate the second work memory in the memory, wherein
the memory area management portion
(a) physically allocates one or plural block storage areas in the memory, allocates to the first work memory the one or plural block storage areas that have been physically allocated, and generates first block management data with which the one or plural block storage areas are associated,
(b) physically allocates one or plural block storage areas in the memory, allocates to the second work memory the one or plural block storage areas that have been physically allocated, and generates second block management data with which the one or plural block storage areas are associated, and
(c) generates, for each piece of the compressed sub-band data, sub-band management data associated with the block management data for the block storage area in which the compressed sub-band data is stored, sequentially according to an arrangement of the sub-band data in a primary scanning direction and a secondary scanning direction in the image data,
the data loading portion changes, according to a rotation angle, an association between the sub-band management data and the block management data after the compressed sub-band data is stored in the second work memory,
the decompression processing portion performs a rotating process in the sub-band data according to the rotation angle,
the sub-band data is data obtained by dividing band data of the image data in the primary scanning direction,
the memory area management portion allocates the first work memory and the second work memory for the band data such that one first work memory and one second work memory are allocated to one piece of the band data,
the sub-band management data includes offset information that represents an offset, from a head of the block storage area, of a start location of the compressed sub-band data corresponding to the sub-band management data,
the data loading portion changes the offset information so as to indicate a value of an offset from a head of the block storage area associated with the second work memory when the association between the sub-band management data and the block management data is changed,
the sub-band management data represents a size of the compressed sub-band data corresponding to the sub-band management data, and
the memory area management portion identifies, for one piece of the band data, a total size of the compressed sub-band data corresponding to the one piece of the band data, based on the sub-band management data, and allocates a storage area having a size based on the total size as the one second work memory.

2. The image processing apparatus according to claim 1, wherein
the sub-band management data includes rotation angle designation information by which the rotation angle is designated as 0 degrees, 90 degrees, 180 degrees, or 270 degrees,
the data loading portion changes the association between the sub-band management data and the block management data according to the rotation angle designated by the rotation angle designation information, and
the decompression processing portion performs the rotating process in the sub-band data according to the rotation angle designated by the rotation angle designation information.

3. An image forming apparatus comprising an image processing apparatus and a printing device that prints an image based on image data having been subjected to image processing by the image processing apparatus, wherein
the image processing apparatus includes
a memory;
a compression processing portion configured to compress image data in units of sub-band data, and store each piece of the sub-band data having been compressed in a first work memory of the memory;
a data storing portion configured to read, from the first work memory, the sub-band data obtained by compressing the image data, and store the sub-band data having been compressed in a data storage area;
a data loading portion configured to read the compressed sub-band data from the data storage area, and store each piece of the compressed sub-band data in a second work memory of the memory;
a decompression processing portion configured to decompress the compressed sub-band data stored in the second work memory; and
a memory area management portion configured to allocate the first work memory in the memory, and transfer, from the first work memory, the sub-band data having been compressed and store, in the data storage area, the sub-band data having been compressed, and to thereafter deallocate the first work memory, and allocate the second work memory in the memory, the memory area management portion
(a) physically allocates one or plural block storage areas in the memory, allocates to the first work memory the one or plural block storage areas that have been physically allocated, and generates first block management data with which the one or plural block storage areas are associated,
(b) physically allocates one or plural block storage areas in the memory, allocates to the second work memory the one or plural block storage areas that have been physically allocated, and generates second block management data with which the one or plural block storage areas are associated, and
(c) generates, for each piece of the compressed sub-band data, sub-band management data associated with the block management data for the block storage area in which the compressed sub-band data is stored, sequentially according to an arrangement of the sub-band data in a primary scanning direction and a secondary scanning direction in the image data, the data loading portion changes, according to a rotation angle, an association between the sub-band management data and the block management data after the compressed sub-band data is stored in the second work memory, and the decompression processing portion performs a rotating process in the sub-band data according to the rotation angle, the sub-band data is data obtained by dividing band data of the image data in the primary scanning direction, the memory area management portion allocates the first work memory and the second work memory for the band data such that one first work memory and one second work memory are allocated to one piece of the band data, the sub-band management data includes offset information that represents an offset, from a head of the block storage area, of a start location of the compressed sub-band data corresponding to the sub-band management data, the data loading portion changes the offset information so as to indicate a value of an offset from a head of the block storage area associated with the second work memory when the association between the sub-band management data and the block management data is changed, the sub-band management data represents a size of the compressed sub-band data corresponding to the sub-band management data, and the memory area management portion identifies, for one piece of the band data, a total size of the compressed sub-band data corresponding to the one piece of the band data, based on the sub-band management data, and allocates a storage area having a size based on the total size as the one second work memory.

4. The image forming apparatus according to claim 3, wherein the sub-band management data includes rotation angle designation information by which the rotation angle is designated as 0 degrees, 90 degrees, 180 degrees, or 270 degrees, the data loading portion changes the association between the sub-band management data and the block management data according to the rotation angle designated by the rotation angle designation information, and the decompression processing portion performs the rotating process in the sub-band data according to the rotation angle designated by the rotation angle designation information.

5. An image processing method executed by an image processing apparatus, wherein the image processing apparatus includes:
  a memory;
  a compression processing portion configured to compress image data in units of sub-band data, and store each piece of the sub-band data having been compressed in a first work memory of the memory;
  a data storing portion configured to read, from the first work memory, the sub-band data obtained by compressing the image data, and store the sub-band data having been compressed in a data storage area;
  a data loading portion configured to read the compressed sub-band data from the data storage area, and store each piece of the compressed sub-band data in a second work memory of the memory;
  a decompression processing portion configured to decompress the compressed sub-band data stored in the second work memory; and
  a memory area management portion configured to allocate the first work memory in the memory, and transfer, from the first work memory, the sub-band data having been compressed and store, in the data storage area, the sub-band data having been compressed, and to thereafter deallocate the first work memory, and allocate the second work memory in the memory, the memory area management portion
(a) physically allocates one or plural block storage areas in the memory, allocates to the first work memory the one or plural block storage areas that have been physically allocated, and generates first block management data with which the one or plural block storage areas are associated,
(b) physically allocates one or plural block storage areas in the memory, allocates to the second work memory the one or plural block storage areas that have been physically allocated, and generates second block management data with which the one or plural block storage areas are associated, and
(c) generates, for each piece of the compressed sub-band data, sub-band management data associated with the block management data for the block storage area in which the compressed sub-band data is stored sequentially according to an arrangement of the sub-band data in a primary scanning direction and a secondary scanning direction in the image data, the data loading portion changes, according to a rotation angle, an association between the sub-band management data and the block management data after the compressed sub-band data is stored in the second work memory, and the decompression processing portion performs a rotating process in the sub-band data according to the rotation angle, wherein the sub-band data is data obtained by dividing band data of the image data in the primary scanning direction, the memory area management portion allocates the first work memory and the second work memory for the band data such that one first work memory and one second work memory are allocated to one piece of the band data, the sub-band management data includes offset information that represents an offset, from a head of the block storage area, of a start location of the compressed sub-band data corresponding to the sub-band management data, the data loading portion changes the offset information so as to indicate a value of an offset from a head of the block storage area associated with the second work memory when the association between the sub-band management data and the block management data is changed, the sub-band management data represents a size of the compressed sub-band data corresponding to the sub-band management data, and the memory area management portion identifies, for one piece of the band data, a total size of the compressed sub-band data corresponding to the one piece of the band data, based on the sub-band management data, and allocates a storage area having a size based on the total size, as the one second work memory.

6. The image processing method according to claim 5, wherein the sub-band management data includes rotation angle designation information by which the rotation angle is designated as 0 degrees, 90 degrees, 180 degrees, or 270 degrees, the data loading portion changes the association between the sub-band management data and the block management data according to the rotation angle designated by the rotation angle designation information, and the decompression processing portion performs the rotating process in the sub-band data according to the rotation angle designated by the rotation angle designation information.

* * * * *